Dec. 22, 1970 W. J. AMBUSK 3,549,406
PROCESS OF COATING POLYMER SURFACES ACTIVATED
BY CORONA DISCHARGE
Filed April 26, 1968 2 Sheets-Sheet 1

WILLIAM J. AMBUSK
INVENTOR.

BY

AGENT

WILLIAM J. AMBUSK
INVENTOR.

3,549,406
PROCESS OF COATING POLYMER SURFACES
ACTIVATED BY CORONA DISCHARGE
William J. Ambusk, Rochester, N.Y., assignor to Eastman Kodak Company, Rochester, N.Y., a corporation of New Jersey
Continuation-in-part of application Ser. No. 511,241, Dec. 2, 1965. This application Apr. 26, 1968, Ser. No. 724,491
Int. Cl. B44d 1/092, 1/12
U.S. Cl. 117—34             11 Claims

ABSTRACT OF THE DISCLOSURE

Polymeric photographic supports particularly polyethylene coated paper containing antistatic material are coated with photographic emulsion layers by corona activation of the polymer surface using a current for generating the corona having a frequency greater than about 200 cycles per second. The frequency of the power source is adjusted to the speed of the corona activation of the surface and the speed of coating the surface to obtain a uniform coating. In a representative process a 400 cycle corona is applied to the polymer surface at 125 f.p.m. and the emulsion layer coated thereon at the same speed.

---

This invention is a continuation-in-part of Ambusk, U.S. patent application Ser. No. 511,241, filed Dec. 2, 1965, now abandoned.

Photographic emulsions have been coated on transparent film base or reflective film or paper surfaces for preparation of black-and-white or color images for projection or viewing against the reflective surface for many years. There has long been a need for a waterproof paper support to prevent processing solutions and wash water from penetrating the paper and thus to decrease the washing and drying time of the processed paper prints. Paper coated with organic solvent solutions of synthetic polymers is useful for this purpose but is fairly costly among other disadvantages. More recently, synthetic polymers such as the polyolefins and linear polyesters have been found to be very useful for waterproofing photographic paper and are readily coated upon paper without use of organic solvents, using relatively cheap polymer extrusion methods.

Figure 1:
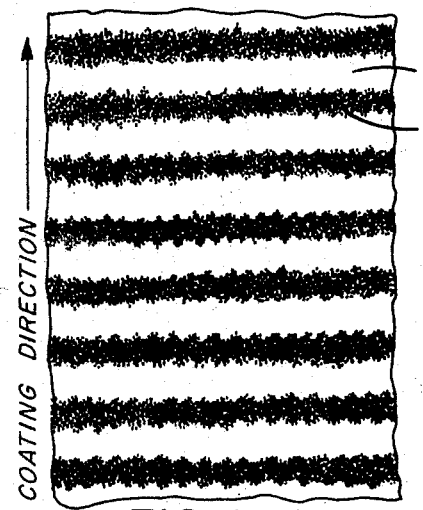

However, as in the case of photographic film base, since the polymer coated paper surface is hydrophobic, the hydrophilic photographic emulsions, especially gelatin-silver halide emulsions, will not adhere unless the polymer surface has been subbed using a composition usually containing a polymer which will adhere to the polymeric paper surface and to which the photographic emulsion layer will in turn adhere. More recently, it has been found that if polymeric surfaces are activated by a strong corona discharge, the photographic emulsions and similar organic colloid layers can be coated with good adherence onto the corona activated polymer surface. This method of adhering the photographic emulsions to the polymer surface materially reduces the cost of manufacture of the waterproof photographic paper but has several serious disadvantages. That is, polymer films, and paper coated with polymers, readily develop static charges during handling and must be provided with antistatic material, particularly when they are to be coated with color emulsion layers. It has now been found that the corona discharge activates the polymer surface of the elements containing antistatic material in a manner or pattern such that a pronounced defect appears in the photographic emulsion or other layers coated on the activated surface which has been called "crosslines." FIG. 1 provides a full-scale reproduction of this crossline defect as it appears in a typical gelatin-silver halide emulsion layer or other layer coated on a corona activated polyethylene coated paper surface. The crosslines extend across the sheet. The crossline effect of the corona is so pronounced as to render the corona activated support useless for coating with photographic emulsions since the crossline pattern is readily visible in prints made on the emulsion layers. The cause of the crossline problem and the solutions of the problem was not readily apparent particularly because some photographic layers did not exhibit the crossline defect while similar layers showed the crossline defect. As will be discussed below, the crossline defect was found to be related to the current frequency of the corona discharge, to chemical and physical properties of the coating compositions and to mechanical properties of the coating machines.

The corona activation of polymer surfaces produces at least two other undesirable effects especially when a plurality of color emulsions are coated upon the activated surface. Usually, the first emulsion coated upon the surface is fogged to some extent by the corona activated surface. Thus, in a typical color system an emulsion containing a yellow dye-forming coupler is coated upon the corona activated surface and magenta and cyan dye-forming emulsion layers are coated upon the top of the yellow emulsion layer. Upon color development of the element, a uniform yellow stain is obtained due to the fogging effect of the corona activated polymer surface upon the yellow emulsion layer.

In addition, most unexpectedly, when the mentioned color emulsion layers are coated upon the corona activated polymer surface, one of the emulsion layers coated thereon may be found to have a mottled image pattern when the element is color developed. That is, a first coated emulsion layer, e.g., the mentioned yellow dye-forming emulsion layer, may not show the mottle defect upon color development of the multilayer element, but the next or even the last emulsion coated upon the activated polymer surface may show the defect.

I have now discovered that the mentioned crossline defect obtained by coating radiation-sensitive layers or other photographic layers upon the corona activated polymer surface especially when an antistatic material is present, can substantially be overcome when the fundamental frequency of the current generating the corona is regulated so that the ribbon of coating comprising the layer does not appreciably respond to the activated polymer surface as the layer is being coated. Generally, the current frequency is different than the resonant frequency of the ribbon of coating. As a result, uniform layers are coated upon the corona activated polymer surface and my invention now allows one or six or more liquid compositions of gelatin, gelatin-silver halide, etc., to be coated simultaneously in one operation upon the activated polymer surface and the crossline defect is not observed in the layers. That is, a ribbon of photographic emulsion or emulsions being coated on a given coating machine has a significant and measurable vibration frequency and responds to wave energy such as sound waves. On becoming resonant to such wave energy the change in amplitude of the ribbon vibration causes objectionable irregularities to appear in the coating. The coating ribbon also appears to resonate with the wave pattern of the static charge on the corona activated polymer surface to cause the crosslines. Accordingly, in my invention the current frequency of the corona can be selected so that resonance of the coating with the activated surface is avoided so the crosslines do not appear and excellent product is obtained.

Figure 4:
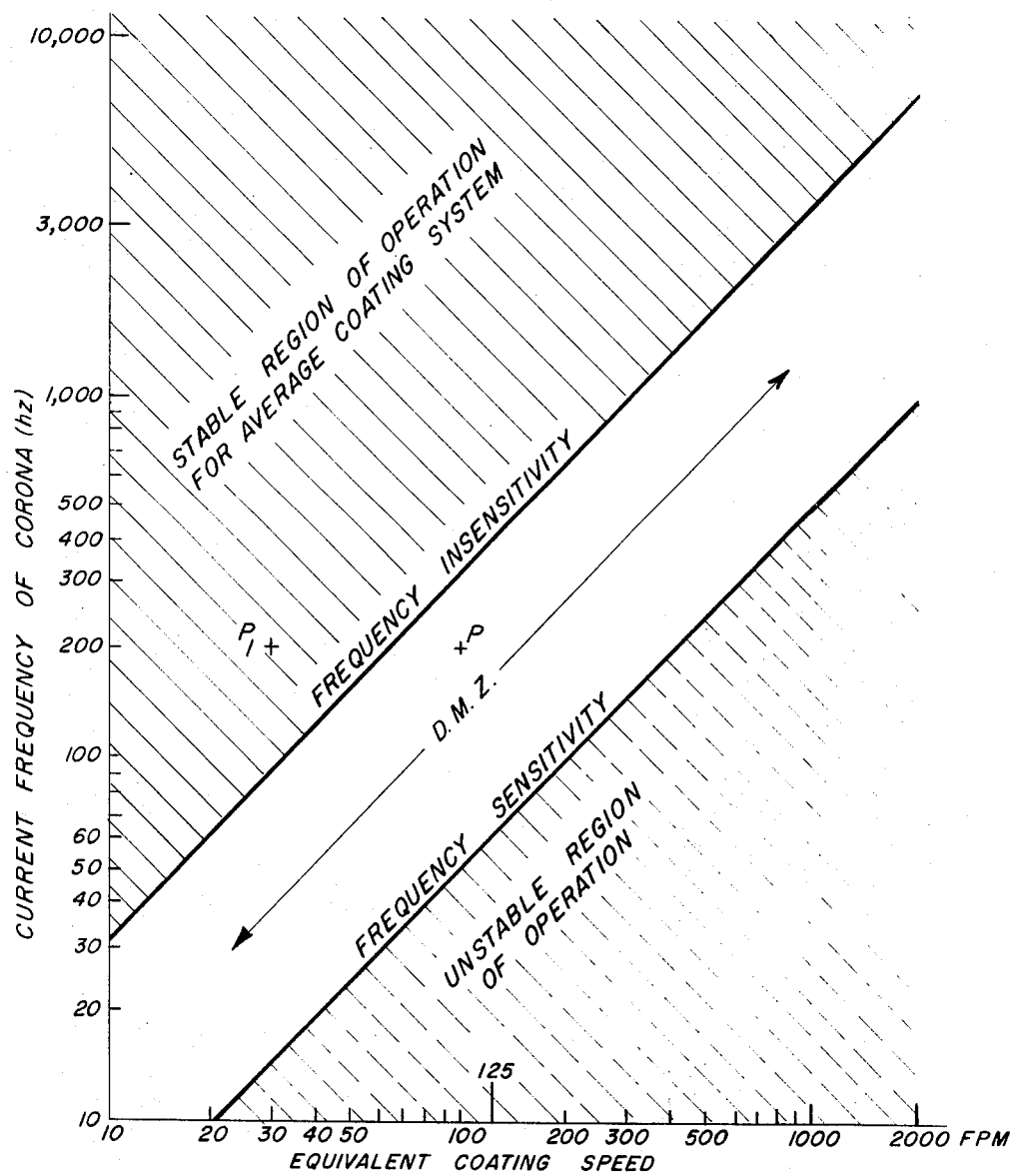

The frequency of the coating ribbon will vary depending in part upon the composition of the ribbon, e.g., its bulk or inertia and the coating machine applying the coating ribbon to the polymer surface. Thus, moving parts comprising a coating machine and coating speed tend to establish the coating ribbon frequency. When it is desirable to actually measure the frequency of a coating ribbon, this can readily be done using an audio oscillator in a well-known manner. However, it is doubtful that the useful current frequencies of the corona at different coating speeds can be calculated from these coating ribbon frequency values. An empirical method can be used to determine, in a given case, the useful current frequency of the corona for different coating speeds on a machine. For example, it can first be determined whether a 60 herz spark-gap type corona applied to a polymer surface provided with antistat at about 50,000 volts and about 100 f.p.m., gives a static pattern which when coated with a silver halide emulsion at about 100 f.p.m., causes an objectionable crossline pattern in the emulsion layer. The current frequency of the corona can then be varied from about 100 to 10,000 Hz. and the emulsion coated thereon at several speeds observing the current frequency and speeds at which the spacing of the crossline corona charge on the polymer surface is still objectionable and particularly observing when the spacing is small enough, that the emulsion coating ribbon does not significantly respond and a uniform emulsion coating is obtained on the polymer surface. Similar data can be obtained by varying the speed of applying the corona to the polymer surface as well as the emulsion coating speed. A chart such as shown in FIG. 4 can then be constructed from the data. The chart shows, e.g., that at current frequency 60 Hz., one or a group of emulsions coated at 125 f.p.m. exhibit the objectionable crossline defect. Similar coating defects occur at frequency of 400 Hz. and 800 f.p.m. coating speed. Other frequencies and coating speeds are used to establish the Frequency Sensitivity line representing the boundary of average, unacceptable conditions for operation. The Frequency Insensitivity line which represents the boundary of the stable region of operation shown in the chart is determnied similarly by observing the conditions of current frequency and coating speed which are useful with one or a group of silver halide emulsions. Accordingly, the chart shows that marginal coating quality is obtainable at current frequencies of about 60 Hz., but at very low coating speed of the order of 20 f.p.m. At more economical coating speeds in excess of 30 f.p.m. the tests indicated that current frequencies in excess of about 200 Hz. at the appropriate coating speeds are desirable. Unexpectedly, it is found that when the current frequency of the corona is at least 200 Hz. and coating speed is such that operation is carried out in the stable region, while a frequency static charge pattern is obtained on the polymer surface, most hydrophilic organic colloid coatings including plain gelatin interlayers, gelatin-silver halide emulsion layers, etc., do not adversely respond to the static pattern and uniform coatings are obtained.

It can be expected that the values shown in the chart of FIG. 4 will vary somewhat for different coating compositions and coating machines but the indications are that, in general, corona power source frequencies greater than about 200 Hz. will yield uniform coatings at the indicated economical coating speeds. The data comprising the chart of FIG. 4 was obtained by use of different current frequencies at different actual coating speeds. However, the coating speed is indicated as Equivalent Coating Speed to recognize the case where the corona is applied to the polymer surface at a different speed than the emulsion coating speed, for example when the corona is applied sometime in advance of the emulsion coating. Thus, the chart can be used to calculate a useful corona frequency when the speed of activation of the polymer surface is, e.g., 400 f.p.m. and the emulsion coating speed is 200 f.p.m. The useful current frequency is thus one-half that which would be useful at an actual coating speed of 400 f.p.m., i.e., one-half of 3,000 Hz. or about 1,500 Hz. This is pertinent to another aspect of the invention discussed in more detail below wherein the coating of color emulsion layers is intentionally delayed at least one-half hour after activation of the polymer surface to avoid emulsion fog and mottle.

Figure 2:
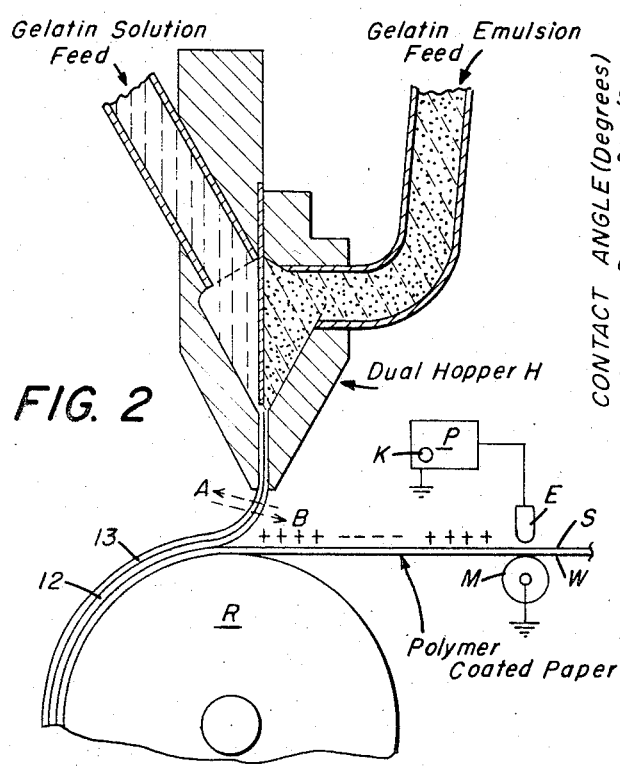

The invention will be better understood by consideration, FIG. 2, of the drawing wherein is shown a typical method for applying corona discharge to a polyethylene coated paper and two photographic layers, 12 and 13, are being simultaneously coated in-line upon the corona activated surface. Due to the mechanical characteristics of the machine, the conditions of coating and the composition of the ribbon of coating, the ribbon tends to respond to the pattern of charges on the corona activated polymer surface and the coating defects are obtained. It appears that as the ribbon approaches the activated polymer surface, it responds to the electrostatic wave pattern thereon possibly in the manner shown by arrows A and B, alternate positive and negative charges on the activated surface tending to repel and attract the coating ribbon. When resonance is attained, the emulsion ribbon does not uniformly coat the activated polymer surface and the mentioned crosslines are seen upon processing the emulsion layer. A similar effect is obtained when coating other layers such as the antistatic backing layer 19 upon the corona activated surface of layer 18 of FIG. 3. As mentioned, this effect is due to the coaction of the corona with the antistatic material present in the polymer coated paper.

In addition to regulating the corona frequency, the intensity of the corona should be maintained at a fairly high level of the order of 25,000 to 50,000 volts depending in part upon the particular polymer surface being activated, the type of silver halide emulsion being coated, particularly the hydrophilic colloid present in coating, web speed, number of electrodes, etc., in order to obtain adequate adhesion of the emulsion layers to the activated surface. At these voltages the corona is effective to give good adhesion when applied to the polymer surface at web speeds of the order of 100–1,000 f.p.m. or higher. The higher voltages are also used so that a web to electrode spacing of, e.g., 1/8 to 1/4 inch can be used and still a corona discharge is obtained. Low voltage such as 10,000 may require such a small web to electrode spacing to produce the corona that the splices in the polymer sheet cannot pas through the apparatus, or only very thin polymeric sheets can be used. There is evidence that at voltages above about 70,000 the corona punctures some polymer surfaces such as polyethylene on paper. Other polymer layers can be expected to resist this action of the corona and that voltages above 70,000 may actually be required to effect proper adhesion of the photographic layers. As described in detail below, the angle of contact of a drop of water on the activated polymer surface can be used to predict the adhesion of a hydrophilic organic colloid layer to the activated surface. However, in other cases, the emulsions should actually be coated on the activated surface to determine the degree of adherence.

The photographic elements which are activated with corona as described above include films or surfaces of various polymers, including addition and condensation polymers which can be corona activated to effect adhesion of hydrophilic polymer materials such as gelatin. These polymers include polyolefins such as polyethylenes and polypropylenes and ethylene-propylene copolymers, polystyrene, polybutenes, polypentenes, polyacrylic acid esters, linear polyesters and polycarbonates such as polyethylene terephthalates, polyamides such as nylon, cellulose esters, polyacrylonitrile, polyvinylidene chloride and other copolymers of the indicated monomers such as ethylene-vinyl acetate copolymers. Paper coated with these polymers is especially useful.

As mentioned above, the invention is very useful with these polymeric films, and paper coated with the polymers when an antistatic material is incorporated into the element. The corona discharge coacts with the antistatic material to cause intensification of the static charge which causes the mentioned coating defect. As illustrated in the examples below, external antistatic material can be coated on the polymer surface opposite that to be coated with the photographic emulsion layer. However, the coating of the antistatic layer itself upon the corona activated polymer surface results in an objectionable crossline pattern being formed in the antistatic layer. Thus, to avoid this coating defect the corona frequency used for activating this polymer surface should also be selected to avoid resonance of the antistatic layer as it is being coated on the activated polymer surface. Antistatic material particularly useful in this layer is a mixture of a (1) colloid such as hydroxymethyl cellulose, (2) colloidal silica and (3) either an alkali metal salt of 2,5-naphthalene disulfonic acid, an alkali metal salt of a lower alkyl naphthalene sulfonic acid, an alkali metal salt of the condensation product of formaldehyde and 2,5-naphthalene disulfonic acid, an alkali metal salt of an alkyl aryl polyether sulfonate or an alkali metal salt of a polymeric carboxylic acid. The compound p-(1,1,3,3-tetramethylbutyl)phenoxyethoxyethyl sodium sulfonate is especially useful. Carbon black can also be used in the polymer layers. The antistatic layers are described in more detail in Miller et al. U.S. patent application Ser. No. 594,226, filed Nov. 14, 1966, now abandoned. An internal antistatic material can be incorporated into the polymer support, into the paper or on the surface of paper which is coated with the above polymeric materials or into the polymer layers on the paper. Antistatic materials especially useful for this purpose inclued salts such as sodium sulfate and the like salts of organic compounds, such as the alkali metal and ammonium salts of the condensation products of an aldehyde such as formaldehyde with naphthalene sulfonic acids, organic antistatic agents, such as triethanolamine oleate, triethanolamine stearate and various polyalkylene polyamine derivatives. Oxyalkylene amine derivatives of phosphorous, polyacryloxyalkyl trialkyl ammonium alkylsulfate salts, diethanol amine salts of phosphate esters, carbon black and the like may also be used. When antistatic materials are used in this way, inside the support, to provide antistatic protection, condenser geometry is present. That is, it can be shown that friction generates a charge on the polymer coated paper but when the internal antistat is present, the charge is stored in the element rather than being periodically discharged to the air or being conducted away to ground. The above external antistatic layers augment the internal antistatic method for overcoming static problems. Chu et al. U.S. Pat. 3,253,922 describes this method for providing internal antistatic protection to polymer coated papers.

The photographic layers which are coated upon the corona activated polymer surfaces in the manner described above include all kinds of organic colloid layers such as gelatin interlayers, gelatin filter layers and gelatin-silver halide emulsion layers. The silver halide can be, e.g., silver bromide, silver iodide, silver chloride or mixed crystals of these silver halides, e.g., silver chlorobromide. The hydrophilic organic colloid of these layers is preferably gelatin but it may be replaced wholly or in part by known gelatin derivatives, water-soluble polymers such as partially hydrolyzed cellulose acetate, cellulose methyl ether, polyvinyl alcohol, hydrolyzed vinyl acetate copolymers, vinyl acetal-vinyl alcohol copolymers, alkylacrylate-acrylic acid copolymers, etc. Emulsion layers particularly susceptible to the deleterious effects of the corona activated polymer surfaces are the incorporated coupler gelatin-silver halide emulsion layers well known in the art. These emulsions contain colored or colorless nondiffusing cyan, magenta and yellow dye-forming coupler compounds.

Representative elements for color photography comprise superposed on the corona activated surfaces, red, green and blue light-sensitive silver halide emulsion layers containing, respectively, a cyan-forming coupler (e.g., a phenolic compound), a magneta-forming coupler (e.g., a 5-pyrazolone compound) and a yellow-forming coupler (e.g., an open chain ketomethylene compound). Suitable nondiffusing couplers are disclosed in U.S. Pats. 2,407,293, 2,640,776 and 2,956,876. The couplers can be incorporated into the emulsion layers in accordance with well-known procedures, e.g., using coupler solvents as described in U.S. Pat. 2,322,027 to Jelley et al.

The elements of the invention, prepared as described by coating one or several emulsion layers on the corona activated polymeric surfaces, after exposure to a subject are processed in the usual manner by use of silver halide developing solutions, fixing solutions, etc. The sensitive elements having the superposed incorporated coupler emulsion layers can be exposed to color negatives and processed directly to color positives by use of conventional developer solutions containing primary aromatic amino silver halide developing agents. Silver images are then bleached and removed along with the residual silver halide leaving the subtractively colored dye images in the layers. It is in this process that it is necessary that the emulsion in contact with the support (and, of course, all emulsions), not be fogged or otherwise adversely affected when coated on the corona activated polymer surface, since fog produces, e.g., yellow stain in highlights and on the borders of the prints. As mentioned, this fogging of the emulsion layers is most unexpectedly avoided by delaying the coating of the emulsion layers until at least about one-half hour after corona activation of the polymeric support, or at least until the fogging action of the activated surface has been dissipated. However, coating should not be delayed too long, e.g., when coating color emulsion layers or the adhesion to the activated surface may be lessened. This delayed coating procedure also prevents formation of mottled dye images in the emulsion layers.

These multilayer color elements can also be processed by reversal to color positives. Thus, the element is exposed, for example to a subtractive color transparency, and as usual, developed with a black-and-white developer solution (a so-called MQ developer), the residual silver halide is then rendered developable by fogging with light or using chemical fogging and color developing solution is used to form the positive dye images in the layers. Silver and residual silver halide are removed by known methods leaving the dye images in the layers. In this process a small amount of fog in a layer due to the corona activated surfaces is not as objectionable since dye obtained from the fogged silver halide is present in the shadow areas of the prints where it is not readily visible.

In the accompanying drawings FIG. 1 shows in full scale the appearance of a static charge (corona activated polymer surface toned with an electrostatic toner) obtained by activation of polyethylene coated paper with 60 Hz. 50,000 volt corona at 125 f.p.m. The emulsion ribbon responds to this charge pattern and produces a similarly appearing crossline defect in the emulsion layer.

Figure 3:
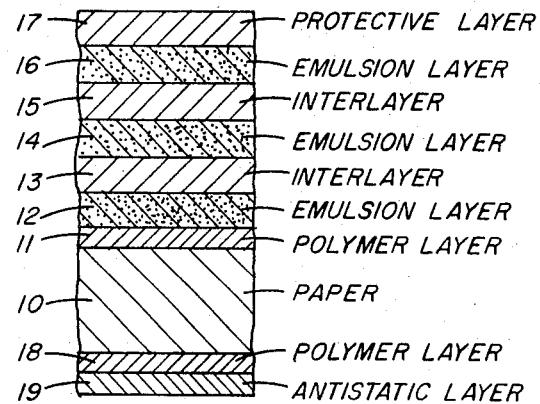

FIG. 2 shows in diagrammatic form one method (dual hopper) for coating two hydrophilic organic colloid layers such as a gelatin emulsion layer 12 and a gelatin interlayer 13 upon the corona activated surface of a polymer coated paper useful for production of a color element such as shown in FIG. 3. The coating ribbon comprising layers 12 and 13 has a frequency sensitivity such that it tends to appreciably respond to the corona charge on the surface which appears to cause the mentioned crossline defect in the emulsion or other layers. The space between the hopper and roll R has been exaggerated for purpose of illustration. In a similar manner all layers 11 to 17 of the element of FIG. 3 can be coated simultaneously using a multiple slide hopper similar to that described in U.S. Pat. 2,671,791, FIG. 10, and by selecting corona of proper current frequency the multilayer ribbon coats uniformly on the activated polymer surface.

FIG. 3 shows in greatly enlarged cross-sectional view the appearance of a representative multilayer photographic element prepared by the process of the invention as described in Example 3 below, by extrusion of polymer layers 11 and 18 upon photographic paper base 10, coating the antistatic layer 19 on the corona activated surface of 18, activating the surface of layer 11 with corona in the presence of air at the required frequency followed at once, or at a later time, by coating the emulsion, interlayer and protective layers 12–17 separately or simultaneously in the manner shown in FIG. 2, corona of the selected frequency being used to activate the polymer surfaces so as to avoid production of uneven coatings.

FIG. 4 shows a representative relation of corona frequency to equivalent coating speed discussed above useful to maintain the coating condition where the corona does not adversely affect the ribbon of emulsion or other hydrophilic organic colloid layer being coated in order that a uniform coating is obtained. As mentioned, the frequencies were found by experiment to be useful when coating the emulsion layers shown in FIG. 3 and described in Example 3 below, at different speeds upon the polyethylene coated paper stock on a given emulsion coating machine. These frequencies can be expected to differ somewhat, for example, when using a different coating machine and when the ribbon of emulsion or other layer being coated has very different properties.

It has been mentioned above that corona activation of the polymer surfaces tends to fog the first coated emulsion layer 12 and to cause mottle to appear in emulsion layer 14 of the FIG. 3 element. However, when emulsion coating of the corona activated polymer surface is delayed at least about one-half hour (e.g., 1–48 hours or longer) after corona activation, the emulsion fog and mottle defects largely disappear.

Figure 5:
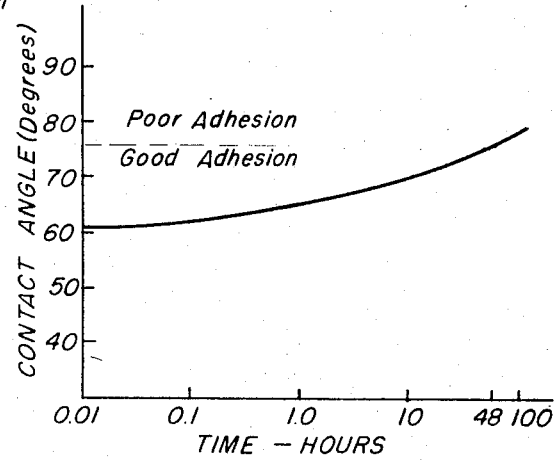

It has also been mentioned that the coating of the photographic layers on the activated polymer surface should not be delayed too long or adhesion will be reduced. FIG. 5 shows the change in adhesion of a particular incorporated coupler gelatin-silver halide emulsion to a corona activated polyethylene surface when coating of the emulsion was delayed from 0.01 to 100 hours. Other silver halide color emulsions can be coated with good adhesion as long as seven days after corona activation and ordinary black-and-white emulsions can be expected to adhere if coated one year after activation of the polymer surface. In FIG. 5 "Contact angle" in degrees is a measure of emulsion layer adhesion to the corona activated polymer surface. In the case of polyethylene surfaces, if the corona activated surface has a contact angle of less than about 76°, for example 40° to 75°, dry and wet adhesion of gelatin layers is usually adequate. Contact angle is the contact angle when a drop of distilled water is placed on a level surface of the activated polymer layer. The contact angle is obtained by projecting the image of the drop onto a suitable screen using a contour projector and measuring the angle of a line tangent to the drop image at the point the edge of the drop touches the sample. In obtaining the data of FIG. 5 a roll of polyethylene coated paper stock was corona activated using a spark-gap type 60 Hz. corona at high voltage (about 50,000) at about 125 f.p.m., so as to obtain adequate emulsion adhesion. Samples were then aged for up to 100 hours and an incorporated coupler silver halide emulsion coated thereon, exposed and processed by the usual color development steps. As a result, those corona activated samples which had been held for from about 1 to 48 hours all had good emulsion adhesion and exhibited no emulsion fog. Those samples held less than one hour before emulsion coating showed decreased adhesion of the coupler-containing emulsion layer as shown by FIG. 5. While contact angle measurements can be used to predict adhesion of gelatin and similar organic colloid layers to activated polymer surfaces, these measurements do not appear to predict the tendency of the activated surfaces to fog or otherwise adversely affect the emulsions.

The corona discharge applied to the polymer surfaces is supplied by well-known power sources. The spark-gap type power source for the corona has current supplied to the electrodes by a spark-gap excited oscillator in a well-known manner. Variation in fundamental frequency of the corona is obtained by changing the primary power frequency of the oscillator. As mentioned, a high voltage corona is desirable, e.g., 25,000 to 50,000 volts or higher, to obtain adequate adhesion of the emulsion layer to the corona activated surface. Voltages of this range are adequate for corona activation of polymers at web speeds of about 100 to 1,000 feet per minute or higher. Voltage is varied by spacing the spark-gaps and by varying the primary voltage to the oscillator.

The spark-gap generator produces high voltage pulses in a discontinuous manner at an average rate of about 5,000 pulses per second, depending on the spark-gap setting. Since the time duration of the pulses is only 10 to 20 microseconds the time "on" to time "off" ratio is about 1 to 10. This is extremely inefficient. The indication of requirement of higher frequencies than 400 Hz., a commercially available power source, and the inefficiencies of the spark-gap generator led to the use of a sinusoidal waveform generator wherein the time on to time off ratio is nearer to 1 to 1. This sort of waveform generator, hereafter called "continuous wave," is available from simple rotating motor-generator sets and frequency control is obtained by speed control of the driving motor. The cost of such equipment is somewhat higher than spark-gap generators but considerably more reliable and maintenance free, and is less expensive than the combination spark-gap generator and higher frequency motor generator power source combination necessary for elimination of the mentioned crossline defect. Accordingly, continuous wave corona is obtained by using as the power source a motor-generator set whereby a sinesoidal waveform generator with a fixed number of poles is driven by a variable speed motor, giving a variable frequency sine wave output. Variation in frequency of the continuous wave corona of from 1,000 to 10,000 or higher cycles per second is obtained by varying the speed of the driving motor. Voltage of the continuous wave corona which is stepped up in value by a multi-tap transformer and varied by field control can vary from about 5,000 volts to 30,000 volts or higher at web speeds of about 100 to 1,000 f.p.m. The corona can be applied to the polymeric surface of a support W, for example, by means of a metal electrode E in FIG. 2, positioned close to the polymeric surface at a point ahead of hopper H where the polymeric surface is passing over a grounded metal roll electrode M coated with a dielectric material such as a linear polyester, electrode E being connected to power source P having a knob K used for varying the corona current frequency. Similarly, metal roller M may be used to support the web with the other electrode E being in effect an array thereof disposed in planetary disposition equidistant from the surface of the metal roller and each being coated with a dielectric, at least on the surface nearest the metal roller. As mentioned above, the spacing of the electrodes to the polymer surface and ground roll should be adequate to produce the corona at the voltage used and yet allow for free passage of polymeric sheet through the activating zone. Corona supplied by DC current, or a combination of AC superimposed on DC can be used. However, there appears to be no advantage in using DC corona and, in fact, AC is preferred since the continuous wave AC corona requires much less power and is, thus, considerably cheaper to use. The following examples will serve to illustrate the invention.

EXAMPLE 1—EFFECT OF ANTISTATIC MATERIAL

Sample 1

A polyethylene coated paper stock free of antistat material having on each surface approximately 8 lbs. polyethylene/1,000 sq. ft. One polyethylene surface is activated at 125 f.p.m. with a corona discharge provided by a 60 Hz. spark-gap type power source at 50,000 volts AC to obtain a contact angle less than 75°. A gelatin-silver halide emulsion is coated onto the activated surface at the same speed from a conventional bead type of coating hopper. The emulsion layer is exposed and developed with a black-and-white developer solution. The silver image obtained in the emulsion layer shows that the emulsion layer is fairly uniform and adhered firmly to the activated surface but the layer is less uniform than when at least 200 Hz. corona is used.

Sample 2

The above polyethylene coated paper containing 8 lbs. polyethylene/1,000 sq. ft. on each surface is provided with internal sodium sulfate antistat and on the wire side with an antistatic layer of a mixture of colloidal silica and the compound p-(1,1,3,3-tetramethylbutyl)phenoxyethoxyethyl sodium sulfonate, as described in Example 3 below, the polyethylene surface having first been activated with corona discharge as described above. The other polyethylene surface is treated with corona discharge as described in Sample 1 after which an electrostatic toner composition is applied to reveal the crossline electrostatic pattern shown to scale in FIG. 1. After sensitizing the activated polyethylene surface with the silver halide emulsion at the same speed as the corona was applied, the same crossline pattern is faintly visible on the dry surface of the emulsion layer. After uniformly exposing the layer to light and processing in the black-and-white developer composition, a silver image is obtained throughout the layer having a crossline pattern similar to that shown in FIG. 1. When prints are made on the emulsion layer, the quality is not acceptable.

EXAMPLE 2—REGULATION OF FREQUENCY OF CORONA POWER SOURCE TO PRODUCE UNIFORM COATINGS

The process of Example 1, Sample 2 is carried out except the current frequency of the corona is 400 Hz. rather than 60 Hz. when activating the polyethylene surface at 125 f.p.m. Application of the electrostatic toner immediately following activation of the polyethylene surface showed the presence of a cross-line electrostatic pattern, the lines of which were spaced only about $\frac{1}{32}$ to $\frac{1}{16}$ inch apart. When the silver halide emulsion is coated onto the activated surface at 125 f.p.m., it adheres firmly, wet and dry, and on processing shows no evidence of the mentioned crossline pattern. As mentioned above, this and subsequent work on the coating machine indicates that, in general, when coating organic colloid solutions such as aqueous gelatin solutions, gelatin-silver halide dispersions, dye solutions, silver halide emulsions containing color couplers, coupler solvents, etc., the coating of such solutions on the polymer surfaces activated with corona generated by at least 400 Hz. current, using the appropriate coating speeds, results in the coating ribbon effectively not responding to the corona pattern whereby a uniform coating is obtained on the activated polymer surface.

EXAMPLE 3

A multilayer color product is prepared having the structure shown in FIG. 3 as follows:

Photographic paper is sized with a gelatin solution of conducting salt to provide an internal antistat, and is extrusion coated on both sides with polyethylene at about 8 lbs./1,000 sq. ft. An external antistat layer is coated from an aqueous dispersion of hydroxyethyl cellulose (1.3 lbs.), colloidal silica (30%, 140 lbs.) and the compound p-(1,1,3,3-tetramethylbutyl)phenoxyethoxyethyl sodium sulfonate (12 lbs.) on the wire side of the polyethylene coated paper, the polyethylene preferably having been first activated with corona preferably of frequency different than the frequency sensitivity of the antistatic layer. The other polyethylene surface is then activated, as shown in FIG. 2 with 400 Hz. spark-gap type of corona at a voltage of about 50,000 and web speed of 125 f.p.m. A dual hopper such as shown in FIG. 2 is used to apply the blue sensitive gelatin emulsion layer 12 and gelatin interlayer 13 simultaneously to the activated polyethylene surface at about 125 f.p.m. The pairs of layers 14, 15 and 16, 17 are coated similarly. Layers 12, 14 and 16 are gelatin silver halide emulsion layers adapted to reversal color processing and primarily sensitive, respectively, to blue, green and red light and containing, respectively, non-diffusing yellow, magenta and cyan-forming couplers. Layers 13, 15 and 17 are gelatin layers. Layers 12 and 13 are coated at 125 f.p.m. in-line with the corona activation of layer 11.

The resulting element is exposed to a color original and processed by known reversal color development methods with the result that the mentioned crossline defect illustrated in FIG. 1 does not appear in the positive dye images. While emulsion layer 12 was fogged slightly by the corona, yellow stain was not seen in the reversal dye images. Magenta mottle did not appear since the corona effect had been dissipated by the time layer 14 was coated. The adhesion of the layers to the corona activated polyethylene surface is excellent. When the layers are coated in the same manner on the polyethylene surface activated with 50,000 volt, 60 Hz. corona at 125 f.p.m., the crossline defect was pronounced and the product not acceptable.

In those cases where the dye stain due to fog is in the emulsion in contact with the corona activated surface, and is not objectionable, this emulsion can be coated first and the other emulsions simultaneously about an hour or more later thereby uniform coatings are obtained free of mottle.

EXAMPLE 4

A photographic element is prepared as in Example 3 having coupler-containing emulsion layers adapted to development directly to negative dye images (positive images with respect to a color negative used for exposing the layers), except all layers 12 to 17 are coated simultaneously on the 400 Hz. activated polyethylene surface using a multiple hopper similar to that of U.S. Pat. 2,761,791 (FIG. 10). The element is exposed to a color negative and color developed directly to produce the positive subtractive color dye images in the layers. The crossline defect does not appear in the images but yellow dye stain is seen in the highlight areas and mottle in the magenta areas. However, when the same polyethylene coated paper activated at 125 f.p.m. with the 50,000 volt, 400 Hz. spark-gap type corona is coated with layers 12 to 17 out-of-line (more than one hour after activation of the polyethylene surface), there is no adverse effect of the corona upon the blue and green sensitive layers 12 and 14 and yellow stain and magenta mottle are not present in these layers.

The procedures of Examples 3 and 4 can be applied to 60–200 Hz. corona activated polymer surfaces using the appropriate emulsion coating speeds but it is apparent that it is less economical to coat the layers at the low speeds required to obviate the crossline pattern defect.

EXAMPLE 5

Photographic paper containing antistatic material is extrusion coated on each surface with about 8 lbs./1,000 sq. ft. of polyethylene terephthalate and provided with an external antistatic layer on the wire side as described in Example 3. Activation of the polymer surface opposite the antistatic layer with the 60 Hz. corona at 125 f.p.m. causes the simultaneously coated incorporated coupler gelatin-silver halide emulsion layers to adhere strongly. However, the mentioned crossline pattern appears in all emulsion layers. When the corona line frequency is increased to about 400 Hz, and applied at 125 f.p.m. and the emulsions coated at the same speed, the crossline defect is not observed. Unexpectedly, no fog appears in the blue sensitive emulsion layer and the green sensitive emulsion layer contains no mottle. This is contrary to the effect of corona activated polyethylene coated paper upon the emulsions.

EXAMPLE 6

Corona from a continuous wave power source of 3,000 Hz. and voltage 28,000 is applied at 300 f.p.m. speed to the polyethylene surface in place of the spark-gap type corona in the process of Example 4 and the emulsions coated in-line at the same speed with the result that the crossline defect was not visible in the superposed emulsion layers. The indications are that this continuous wave corona allows somewhat more latitude in corona frequency at a given emulsion coating speed since a more random static charge tends to be obtained on the activated polymer surface. Also, the continuous wave power source is materially cheaper to use than the spark-gap type power source because of the lower equipment costs and higher efficiencies of this equipment.

EXAMPLE 7

Pigmented polyethylene sheeting containing antistat material is used in Example 4 in place of the polyethylene coated paper. The 250 Hz. corona applied to the polyethylene surface at the emulsion coating speed of 70 f.p.m. results in good adhesion of the emulsion layers and the crossline defect is not evident.

EXAMPLE 8

The process of Example 3 is carried out except using a continuous wave corona of 3,000 Hz. at 28,000 volts and 125 f.p.m., the emulsions being coated at the same speed on the activated polyethylene surface at a speed of 125 f.p.m. The crossline defect is not present and the emulsions adhere well.

EXAMPLE 9

A polyethylene coated paper prepared as in Example 3 is activated with continuous wave corona of 10,000 Hz, at a 800 f.p.m. and a voltage of 50,000. A gelatin-silver halide emulsion layer is coated thereon at 800 f.p.m. Upon development of the emulsion in a hydroquinone developer composition no coating irregularities are noted and the emulsion adheres strongly.

EXAMPLE 10

The process of Example 4 is carried out except using polypropylene instead of polyethylene and preferably activating the polypropylene surface to a greater extent either by using higher voltage corona or applying it at a lower web speed. Thus, the gelatin emulsion adheres satisfactorily when the contact angle obtained by corona activation is less than about 54° whereas in the case of polyethylene a contact angle less than about 76° is adequate. As a result of controlling the frequency of the corona and coating speed, the emulsion adheres well to the polypropylene surface; the crossline defect is not observed.

EXAMPLE 11

A kraft paper stock is provided which is internally sized with aluminum stearate, tub sized with starch and has a weight of about 27 lbs. per 1,000 sq. ft. The stock is extrusion coated on each surface with about 2.5 lbs. polyethylene per 1,000 sq. ft.

The polyethylene layer on the face side of the paper is corona activated with 400 Hz., 50,000 volt AC corona at about 125 f.p.m. Electrostatic toner applied to the surfaces shows the presence of a very closely spaced electrostatic charge. In the manner described in U.S. Pat. 3,146,104 an aqueous dispersion of carbon and gelatin tanning silver halide developing agent in gelatin is coated upon the corona activated surface at 125 f.p.m. so as to obtain about 600 mg. gelatin per sq. ft. The layer is uniform. Thereafter, a gelatin-silver halide emulsion is coated on the carbon layer and then a fogged gelatin-silver halide emulsion layer is coated on the first emulsion layer. The product is exposed to a subject activated with alkaline solution to develop the image and development stopped with the acetic acid solution. As a result, a lithographic printing plate is obtained, the image of which shows the layers had been uniformly coated onto the 400 Hz. corona activated surface.

When the process is carried out in the same manner except using 60 Hz. corona instead of 400 Hz. corona, an objectionable electrostatic charge pattern is obtained on the polyethylene surface and the layers do not coat uniformly on the surface.

EXAMPLE 12

A laminated glassine paper stock to which no antistat material has been added is prepared as described in Wood et al. U.S. Pat. 3,260,602. This stock contains two thin layers of glassine paper bonded by polyethylene and the laminate coated on each surface with polyethylene.

The stock is treated on one polyethylene surface with 400 Hz., 50,000 volt corona at 125 f.p.m. A 9% aqueous gelatin solution containing Malachite Green dye is coated at 125 f.p.m. onto the polyethylene surface to obtain a uniformly colored layer useful on the product for curl control and identification purposes. When the same process is carried out using 60 Hz. corona instead of 400 Hz. corona, an electrostatic toner shows the presence on the surface of a charge such as shown in FIG. 1 and the green gelatin layer does not coat as uniformly. A similar result is obtained when the other polyethylene surface of the element is activated using either 60 Hz. or 400 Hz. corona followed by coating a gelatin-silver halide emulsion layer. The 60 Hz. corona causes the emulsion layer to coat nonuniformly.

In the manner of the above examples, the other polymer films and polymer coated papers are activated with corona of frequency different than the frequency sensitivity of the coatings.

It should be noted that in the drawings, in FIG. 4, region DMZ represents a zone of operation to usually be avoided since many photographic solutions do not coat satisfactorily. For example, on a polyethylene surface activated with corona of current frequency 200 Hz., many solutions do not coat uniformly at 100 f.p.m. (point P), whereas at 30 f.p.m. (point $P_1$) the solutions will coat with good uniformity. However, it should be understood that the location and area of region DMZ will vary depending in part upon the solutions being coated and the coating machine.

The invention has been described in detail with particular reference to preferred embodiments thereof, but it will be understood that variations and modifications can be effected within the spirit and scope of the invention as described hereinabove, and as defined in the appended claims.

I claim:

1. In a process for preparing a photographic element in which a polymeric surface of a support containing antistatic material is activated by corona discharge and a light-sensitive photographic emulsion layer is coated upon the activated polymeric surface from a coating device in the form of an unsupported body of coating material, the improvement for obtaining greater uniformity of coating on the activated polymeric surface which comprises activating the polymeric surface with corona discharge to produce a periodic variation in electrostatic charge on the surface, the frequency of the current generating the corona discharge being greater than about 200 cycles per second, coating on the activated polymeric surface at least one of a plurality of layers which includes a light-sensitive photographic layer from said coating device as said activated surface moves past the coating device, the frequency of the corona being adjusted to the speed of corona treatment of the surface and to the speed of coating the layer on the surface, to provide a uniform coating on the surface.

2. The process of claim 1 wherein the corona discharge is supplied by a spark-gap type AC power source at a fundamental frequency greater than about 200 cycles per second and a voltage sufficiently high to cause good adhesion of the emulsion layer to the activated polymeric surface.

3. The process of claim 1 wherein the corona discharge is supplied by a continuous wave AC power source at a fundamental frequency greater than about 200 cycles per second at a voltage sufficiently high to cause good adhesion of the emulsion layer to the activated polymeric surface.

4. The process according to claim 1 wherein the support is paper having polymeric surfaces on each side.

5. The process according to claim 4 wherein the polymeric surface of the paper which is activated by the corona discharge is polyethylene, polypropylene, an ethylene copolymer or a linear polyester.

6. The process of claim 4 wherein an internal antistatic material is in direct contact with the paper and an external antistatic material is present on the polymer surface opposite to the activated polymer surface.

7. In a process for preparing a photographic element in which a polymeric surface of a support containing antistatic material is activated by corona discharge and a light-sensitive photographic emulsion layer is coated upon the activated polymeric surface from a coating device in the form of an unsupported body of coating material, the improvement for obtaining greater uniformity of coating on the activated polymeric surface which comprises activating the polymeric surface with corona discharge to produce a periodic variation in electrostatic charge on the surface, the frequency of the current generating the corona discharge being greater than about 200 cycles per second, coating on the activated polymeric surface at least one of a plurality of differently sensitized photographic emulsion layers from said coating device as said activated surface moves past the coating device, the frequency of the corona being adjusted to the speed of corona treatment of the surface and to the speed of coating the layer on the surface, to provide a uniform coating on the surface.

8. The process according to claim 7 wherein the differently sensitized emulsion layers contain color-forming coupler compounds and the unsupported body of coating flowing to the activated polymer surface comprises at least one of said emulsion layers.

9. The process according to claim 7 wherein the differently sensitized emulsion layers contain color-forming coupler compounds and the unsupported body of coating flowing to the activated polymer surface includes all of the emulsion layers which are coated simultaneously onto the polymer surface.

10. The process according to claim 8 wherein the emulsion layers include three gelatin-silver halide emulsion layers primarily sensitive to blue, green and red light, respectively, and contain coupler compounds for forming subtractively colored dye images in the layers by reaction with a primary aromatic amino silver halide developing agent.

11. The process of claim 7 wherein the frequency of the current is about 200 to 10,000 cycles per second.

References Cited

UNITED STATES PATENTS

| | | | |
|---|---|---|---|
| 2,859,480 | 11/1958 | Berthold | 117—93.1X |
| 2,864,755 | 12/1958 | Rothacker | 117—138.8X |
| 2,864,756 | 12/1958 | Rothacker | 204—168 |
| 2,910,723 | 11/1959 | Traver | 204—168 |
| 2,935,418 | 5/1960 | Berthold et al. | 204—168 |
| 2,939,956 | 6/1960 | Parks | 117—47 |
| 2,993,803 | 7/1961 | Sulich et al. | 117—34 |
| 3,019,124 | 1/1962 | Rogers | 117—34X |
| 3,117,865 | 1/1964 | Crawford | 96—85 |
| 3,161,519 | 12/1964 | Alsup | 96—83 |
| 3,253,922 | 5/1966 | Chu et al. | 96—85 |
| 3,260,602 | 7/1966 | Wood et al. | 96—85 |
| 3,322,556 | 5/1967 | Munden et al. | 117—34 |
| 3,376,208 | 4/1968 | Wood | 117—47X |

FOREIGN PATENTS

| | | | |
|---|---|---|---|
| 971,058 | 5/1963 | Great Britain | 96—85 |

WILLIAM D. MARTIN, Primary Examiner

W. R. TRENOR, Assistant Examiner

U.S. Cl. X.R.

96—85; 117—47, 93.1; 204—312